United States Patent [19]
Clark

[11] 3,759,543
[45] Sept. 18, 1973

[54] VARIABLE SPEED LEVER ACTION BICYCLE DRIVE

[76] Inventor: Marion A. Clark, 546 W. Pleasant, Tulare, Calif. 93274

[22] Filed: May 22, 1972

[21] Appl. No.: 255,642

[52] U.S. Cl. .............................. 280/236, 280/255
[51] Int. Cl. ...................... B62m 1/04, B62m 23/00
[58] Field of Search................... 280/255, 238, 236, 280/253, 254, 256, 257, 258, 251

[56] References Cited
UNITED STATES PATENTS

| | | | |
|---|---|---|---|
| R20,729 | 5/1938 | Hendricks | 280/257 |
| 556,545 | 3/1896 | Ljungstrom | 280/251 |
| 849,342 | 4/1907 | Swinbank | 280/255 X |
| 3,375,023 | 3/1968 | Cox | 280/255 X |
| 3,414,293 | 12/1968 | Frye | 280/254 |

FOREIGN PATENTS OR APPLICATIONS

| | | | |
|---|---|---|---|
| 10,055 | 10/1928 | Australia | 280/255 |
| 533,339 | 12/1921 | France | 280/255 |

Primary Examiner—Robert S. Ward, Jr.
Attorney—Carl R. Brown et al.

[57] ABSTRACT

A bicycle drive comprising a pair of levers pivotally mounted on opposite sides of the bicycle frame, with foot pedals at their extremities. The rear wheel has dual sprockets with one way clutches, each sprocket being connected to one lever by a chain and cable, so that a downward stroke of the lever drives the wheel. The chain is concealed in the frame members and the cable connection to the lever is by means of a bracket which is movable along the lever by foot action, to vary the effective lever arm without changing the pedal stroke. Both pedals can be operated independently, alternately, or together to drive the bicycle, and speed can be shifted on each side independently without interrupting the driving effort.

12 Claims, 5 Drawing Figures

PATENTED SEP 18 1973 3,759,543
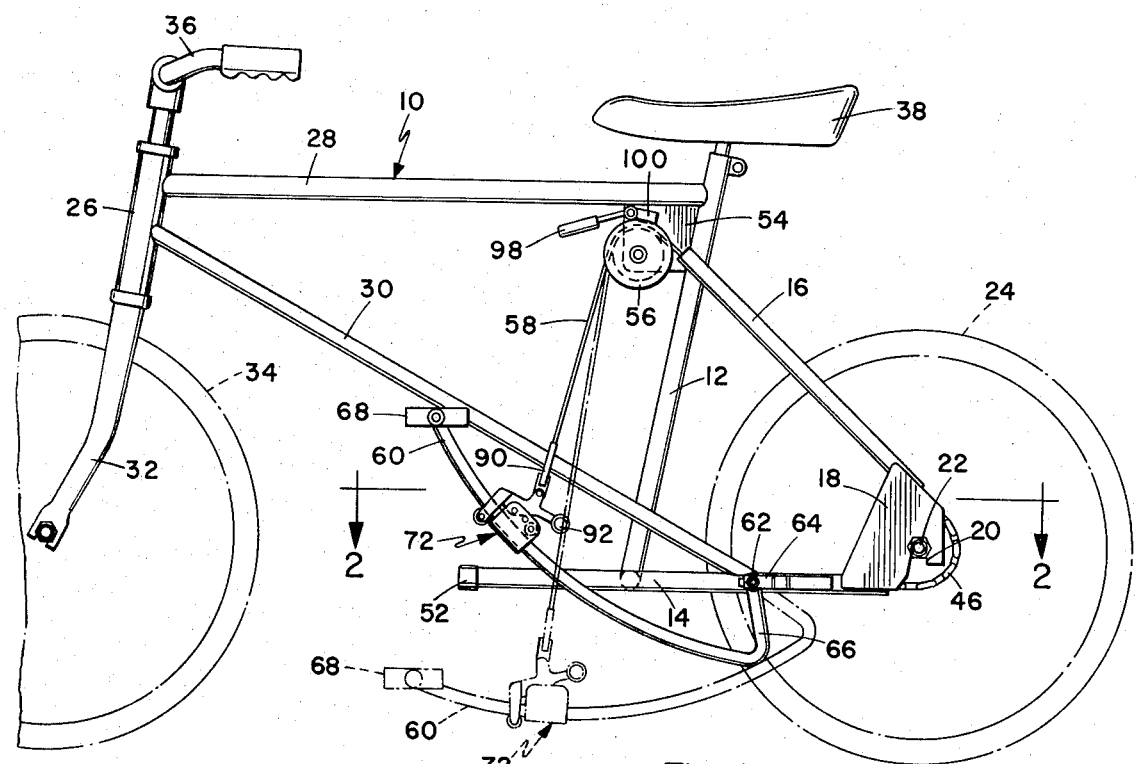
Fig. 1
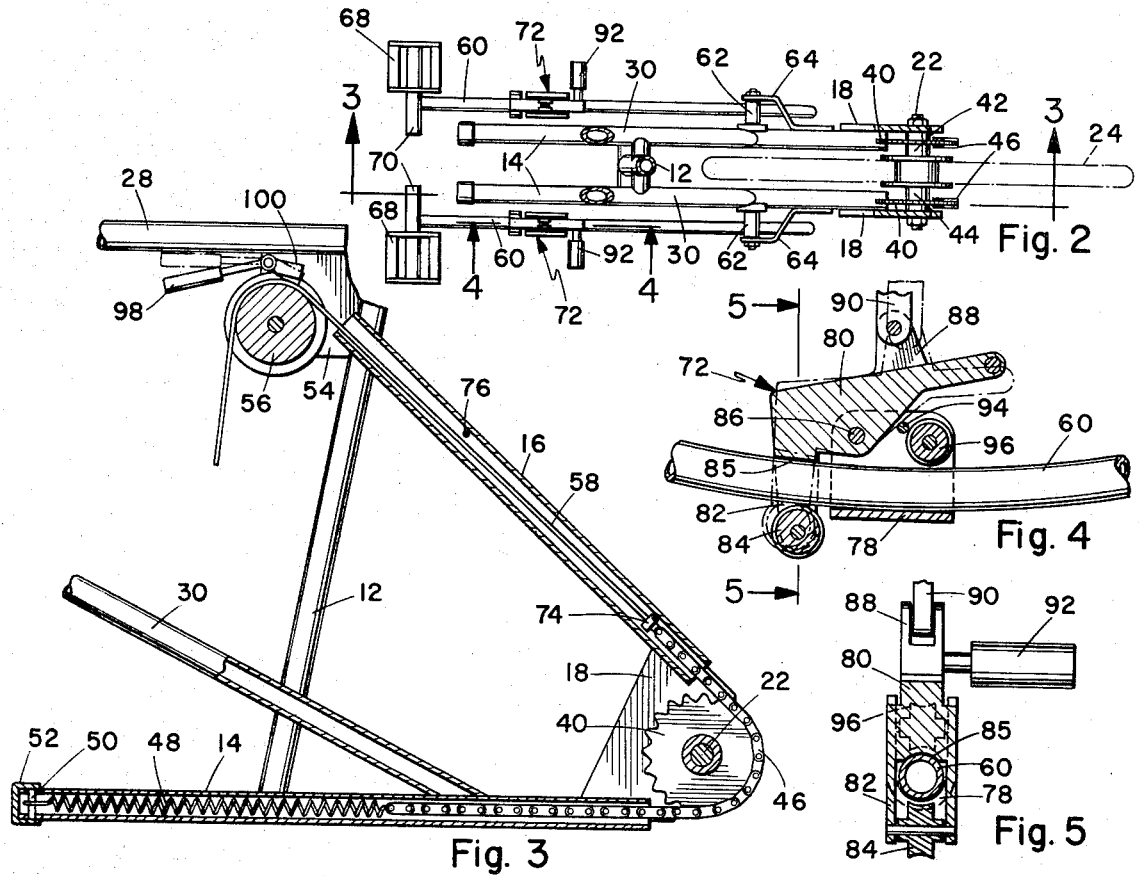
Fig. 2
Fig. 3
Fig. 4
Fig. 5

3,759,543

VARIABLE SPEED LEVER ACTION BICYCLE DRIVE

BACKGROUND OF THE INVENTION

Conventional bicycles have pedals on a rotating crank arm with sprocket and endless chain connection to the rear wheel. Speed shift means in the form of variable gear sets is incorporated at the rear wheel and, in some instances, at the pedals as well. Such mechanisms are complex and require frequent attention to maintain alignment. The rotating crank arrangement is inefficient since maximum leverage is applied through only a portion of each stroke, the leverage at top and bottom of the circle of rotation being very small. Pump action lever mechanisms have been developed to provide near constant leverage, but speed variation has not been accomplished without complex lever means or the addition of gears.

SUMMARY OF THE INVENTION

The bicycle drive described herein has a pair of levers hinged at their rear ends on opposite sides of the bicycle frame, with the pivots adjacent the rear wheel and pedals on the forward ends of the levers. The rear wheel has dual sprockets, each with a one way clutch, and a chain extends around a portion of each sprocket, the major portion of the chain being concealed in the frame members. One end of each chain is attached to a return spring inside the frame, the other end being connected by a cable to a shift unit slidably mounted on the associated lever. A foot operated shift arm on the unit allows the cable connection to be adjusted relative to the pivot of the lever, brake means being provided to restrain the cable and the drive action while the shift is made. The pedal lever is arcuate along its length so that shifting is easy and the pedal stroke is not changed over the speed range. Pedal stroke is limited by stops and the pedals can be used individually or together, alternately or simultaneously to drive the bicycle. Speed shifting can also be accomplished independently or simultaneously on the two sides. In rest position the pedals are stopped at the top of their stroke, ready for an immediate start.

The primary object of this invention, therefore, is to provide a new and improved variable speed lever action bicycle drive.

Another object of this invention is to provide a lever action bicycle drive with a portion of the mechanism concealed in the bicycle frame.

Another object of this invention is to provide a new and improved lever action bicycle drive with foot operated speed change mechanism, which is operable while driving power is continuously applied.

A further object of this invention is to provide a new and improved lever action bicycle drive in which the two levers are operable separately or together to propel the bicycle.

Other objects and many advantages of this invention will become more apparent upon a reading of the following detailed description and an examination of the drawing, wherein like reference numerals designate like parts throughout and in which:

FIG. 1 is a side elevation view of a bicycle incorporating the lever action drive.

FIG. 2 is a sectional view taken on line 2—2 of FIG. 1.

FIG. 3 is an enlarged sectional view taken on line 3—3 of FIG. 2.

FIG. 4 is an enlarged sectional view taken on line 4—4 of FIG. 2.

FIG. 5 is an enlarged sectional view taken on line 5—5 of FIG. 4.

DESCRIPTION OF THE PREFERRED EMBODIMENT

The bicycle frame 10 comprises a saddle post 12 with spaced parallel side rails 14 fixed to the lower end and extending forwardly and rearwardly from the post. From the upper portion of saddle post 12, dual rear fork members 16 extend diagonally and are secured to the rear ends of said rails 14 by web plates 18. The web plates have slots 20 to receive the axle 22 of rear wheel 24. The front post 26 of the frame 10 is supported by a top horizontal bar 28 from the upper end of saddle post 12, and is braced by dual diagonal members 30 passing on opposite sides of the saddle post to join side rails 14. A front fork 32 and wheel are mounted in front post 26 and provided with handlebars 36, and a suitable saddle 38 is secured in saddle post 12. The frame structure can vary to some extent, but to adapt to the lever action drive mechanism, the side rails 14 and rear fork members 16 are tubular and open ended, and terminate at the web plates 18 rather than actually joining.

Rear wheel 24 has dual sprockets 40 with oppositely engaging clutches 42 and 44 of conventional type to drive the wheel. Each sprocket 40 is coplanar with the axes of tubular side rails 14 and rear fork members 16, and is positioned so that a drive chain 46 passing around the sprocket will extend slidably into the tubular members, as in FIG. 3. Inside side rail 14, the chain 46 is coupled by a return spring 48 to a retaining pin 50 at the forward end of the side rail, which is closed by an end cap 52. At the junction of saddle post 12 and top bar 28 is a mounting plate 54, on opposite sides of which are freely rotatable pulleys 56. The other end of each chain 46 is attached to a cable 58 which extends from rear fork member 16 and passes over the associated pulley 56.

On each side of the frame is a drive lever 60 pivotally mounted on a bearing 62 secured to side rail 14 rearwardly of the saddle post, the outer end of the bearing being supported by a brace 64 from the side rail. Drive lever 60 is arcuate along its length and is spaced downwardly from bearing 62 by an offset portion 66 at the rear end. At the forward end of each drive lever 60 is a conventional pedal 68, with an inwardly projecting stop bar 70 which engages under diagonal member 30 to limit the upward travel of the lever. Slidably mounted on each drive lever 60 is a speed shift unit 72, to which the end of the associated cable 58 is attached. Downward travel of the lever 60 is limited by a stop collar 74 fixed on cable 58 inside rear fork member 16, to engage a stop pin 76 fixed across the member. In the full down position, indicated in broken line in FIG. 1, the drive lever 60 is generally horizontal, the center of radius of its arcuate configuration being approximately at the contact of cable 58 with pulley 56. The shift unit 72 can thus be moved along the drive lever in this position without changing the length of the extended portion of the cable.

Each shift unit 72, illustrated in detail in FIGS. 4 and 5, has a U-shaped saddle bracket 78 which fits under and straddles the drive lever 60. Pivotally mounted in saddle bracket 78 is a bellcrank 80, having a fork 82 which straddles the lever 60 from above, forward of the saddle bracket, and in the lower end of the fork is a front roller 84. The upper end of fork 82 has a concave clamp face 85 shaped to fit on the top of the drive lever. Rearwardly of the pivot pin 86 of bellcrank 80 is an upwardly extending lug 88 to which cable 58 is attached by a link 90. Fixed to the rear of bellcrank 80 is an outwardly projecting foot bar 92. Downward motion of the foot bar is limited by a stop pin 94 fixed across saddle bracket 78 to engage the underside of the bellcrank. Mounted in the rear portion of saddle bracket 78 is a rear roller 96 above the drive lever 60.

With tension on cable 58 behind the pivot pin 86, as when pressure is applied to pedal 68, the clamp face 85 of bellcrank 80 is forced down on drive lever 60 and saddle bracket 78 is pulled up under the drive lever, with a binding action. During normal pedalling there is no tendency for the shift unit 72 to slip, since the return spring 48 maintains tension on the cable 58 as the drive lever rises.

Speed shifting is best accomplished with the drive levers in the full down position. To prevent the return springs from pulling the drive levers up when the feet are moved from pedals 68 to foot bars 92, hand brakes are provided to clamp cables 58. On each side of mounting plate 54 above pulley 56, is a pivotally mounted handle 98 extending forwardly under top bar 28. On the rear of each handle 98 is a brake shoe 100 which, when the handle is pulled up as indicated in broken line in FIG. 3, fits into pulley 56 and clamps the cable 58.

When foot bar 92 is pressed down to jam bellcrank 80 against stop pin 94, the front roller 84 is lifted into contact with the underside of drive lever 60, as in broken line in FIG. 4. With the front roller acting as a bearing, saddle bracket 78 is pushed down from the drive lever until rear roller 96 engages the top of the drive lever. The shift unit 72 will then move freely on roller bearings, propelled by the foot, to any selected position along the drive lever. Handle 98 is then released and normal pedalling can be resumed. The speed shift changes the effective lever arm from the bearing 62 to the connection of cable 58 to the drive lever 60, but the stroke of the drive lever is not changed. With shift unit 72 near pedal 68, a stroke of the drive lever will produce a large rotation of the rear wheel, equivalent to a high gear ratio. When the shift unit is moved rearwardly, a full stroke of the drive lever will produce proportionally smaller rotation of the rear wheel, corresponding to a low gear ratio.

By using dual sprockets and clutches, the two drive levers can be pedalled together or independently. A unique feature of this arrangement is that speed can be shifted on each drive lever separately while the other is being pedalled, so that there is no break in the drive of the bicycle. This is particularly useful in riding uphill, when use of a conventional gear type speed shift causes loss of momentum.

With the drive chain almost entirely concealed within the tubular frame structure, the rider is not in danger of snagging clothing or picking up oil stains. Also, adjustment of the rear wheel is not critical, since any deviation in chain and sprocket positions are taken up by the return springs.

Having described my invention, I now claim:

1. In a bicycle having a frame with a driven rear wheel mounted therein, a lever action drive mechanism comprising:
   a pair of elongated drive levers pivotally mounted to swing substantially vertically on the rear portion of said frame and extending forwardly on opposite sides thereof,
   said rear wheel having a pair of sprockets, each with a one way clutch coupled to drive the wheel in a forward direction,
   a shift unit slidably adjustably mounted on each drive lever,
   a drive chain passing around each of said sprockets and having a connection to the respective shift unit,
   and foot pedals attached to the forward ends of said drive levers.

2. A drive mechanism according to claim 1, wherein said chain has one end connected to the shift unit, and a return spring between the other end of said chain and the frame to bias said drive lever upwardly.

3. A drive mechanism according to claim 2, wherein said frame has tubular rear wheel supporting members terminating adjacent each sprocket, said springs and portions of each chain being enclosed in said members.

4. A drive mechanism according to claim 1, wherein each shift unit comprises a saddle bracket straddling the drive lever, a bellcrank pivotally mounted in said saddle bracket and having a clamp portion for engagement with the drive lever, said chain being connected to said bellcrank offset from the pivot to apply clamping pressure under tension of the chain, and means on said bellcranks for releasing the clamping pressure and moving the shift units along the drive levers.

5. A drive mechanism according to claim 4 wherein said last mentioned means comprises a foot bar projecting from the end of the bellcrank opposite said clamping portion, said saddle bracket and said bellcrank having rollers for engagement on the drive lever when said foot bar is depressed.

6. A drive mechanism according to claim 1, wherein said frame has pulleys mounted on the upper portion thereof,
   each of said chains having a cable connected to one end and passing over the respective pulley to the shift unit,
   and a return spring connected between the other end of each chain and said frame to bias said drive levers upwardly.

7. A drive mechanism according to claim 6, and including brake means mounted adjacent said pulleys for restraining said cables while said shift units are operated.

8. A drive mechanism according to claim 6, and including stop means for limiting the upward and downward travel of said drive levers.

9. A drive mechanism according to claim 8, wherein said drive levers are arcuate along their length, with the centers of radius approximately at the points of contact of the downwardly extending cables with their respective pulleys, when the drive levers are at their fully downward positions.

10. A drive mechanism according to claim 9, wherein each of said shift units comprises a saddle bracket straddling the drive lever from below, a bellcrank pivotally mounted in the bracket and having a clamp portion for engagement with the drive lever from above, said cable being connected to the bellcrank offset from the pivot to apply clamping action by tension on the cable, and a foot bar projecting from the end of the bellcrank opposite said clamping portion for selective release of clamping pressure.

11. A drive mechanism according to claim 10, wherein said bellcrank has a fork extending below the clamping portion, with a roller therein for engagement below the drive lever, a roller rotatably mounted in said saddle bracket above the drive lever, and a stop in said saddle bracket for limiting the movement of said bellcrank in the clamping pressure release action, whereby the rollers are urged into contact with the drive lever for rolling support of the shift unit.

12. A drive mechanism according to claim 11, and including brake means mounted adjacent said pulleys for selectively restraining the cables therein.

* * * * *